US010023287B2

(12) United States Patent
Räckers et al.

(10) Patent No.: US 10,023,287 B2
(45) Date of Patent: Jul. 17, 2018

(54) METHOD FOR MANUFACTURING A SHELL ELEMENT REINFORCED WITH SUPPORT ELEMENTS (71) Applicant: Airbus Operations GmbH, Hamburg (DE)

(72) Inventors: Bernd Räckers, Bremen (DE); Martin Gerber, Bremen (DE)

(73) Assignee: AIRBUS OPERATION GMBH, Hamburg (DE)

( * ) Notice: Subject to any disclaimer, the term of this patent is extended or adjusted under 35 U.S.C. 154(b) by 939 days.

(21) Appl. No.: 14/566,010

(22) Filed: Dec. 10, 2014

(65) Prior Publication Data
US 2015/0166168 A1 Jun. 18, 2015

(30) Foreign Application Priority Data

Dec. 12, 2013 (DE) .......................... 10 2013 225 707

(51) Int. Cl.
*B64C 1/12* (2006.01)
*B29C 65/48* (2006.01)
(Continued)

(52) U.S. Cl.
CPC ............ *B64C 1/12* (2013.01); *B29C 65/4835* (2013.01); *B29C 65/5014* (2013.01);
(Continued)

(58) Field of Classification Search
CPC ............ B29C 65/7814; B29C 65/7808; B29C 66/0224; B29C 66/02241;
(Continued)

(56) References Cited

U.S. PATENT DOCUMENTS 4,863,663 A    9/1989   Nico et al.
5,487,930 A * 1/1996   Lockshaw ................ B32B 3/12
                                                                       156/290

(Continued)

FOREIGN PATENT DOCUMENTS

DE    19844035 C1    11/1999
DE    10007995 A1     9/2001
(Continued)

OTHER PUBLICATIONS

European Patent Office, European Search Report for European Patent Application No. 14 19 3499.2 dated May 29, 2015.
(Continued)

*Primary Examiner* — John Goff
(74) *Attorney, Agent, or Firm* — Lorenz & Kopf, LLP (57) ABSTRACT

A method for manufacturing a shell element reinforced with support elements comprises providing a skin element that has an outer surface and an inner surface opposite the outer surface, providing a first support element that has an attaching side and a free side opposite the attaching side, attaching the first support element on the skin element such that the attaching side of the first support element faces the inner surface of the skin element. A first recess is introduced into the first support element that proceeds from the free side of the first support element and extends transversely to the first axis. A second support element is provided that has a support side and a front side opposite the support side. The second support element is inserted into the first recess of the first support element such that the support side faces the inner surface of the skin element.

10 Claims, 4 Drawing Sheets

(51) Int. Cl.
    *B29C 65/50*     (2006.01)
    *B29C 65/00*     (2006.01)
    *B64C 1/06*     (2006.01)
    *B32B 37/02*     (2006.01)
    *B32B 37/16*     (2006.01)
    *B32B 38/00*     (2006.01)
    *B64C 3/26*     (2006.01)
    *B29L 31/30*     (2006.01)
    *B64C 1/00*     (2006.01)

(52) U.S. Cl.
    CPC .... *B29C 65/5042* (2013.01); *B29C 66/02241* (2013.01); *B29C 66/112* (2013.01); *B29C 66/114* (2013.01); *B29C 66/12441* (2013.01); *B29C 66/4326* (2013.01); *B29C 66/43441* (2013.01); *B29C 66/43461* (2013.01); *B29C 66/7212* (2013.01); *B29C 66/73756* (2013.01); *B29C 66/73941* (2013.01); *B32B 37/02* (2013.01); *B32B 37/16* (2013.01); *B32B 38/0004* (2013.01); *B64C 1/06* (2013.01); *B64C 3/26* (2013.01); *B29C 66/301* (2013.01); *B29C 66/5326* (2013.01); *B29L 2031/3076* (2013.01); *B29L 2031/3082* (2013.01); *B29L 2031/3085* (2013.01); *B29L 2031/3097* (2013.01); *B32B 2038/0076* (2013.01); *B32B 2305/076* (2013.01); *B32B 2605/18* (2013.01); *B64C 2001/0072* (2013.01); *Y02T 50/433* (2013.01); *Y10T 156/1064* (2015.01)

(58) Field of Classification Search
    CPC ........ B29C 66/02245; B29C 66/03241; B29C 66/0326; B64C 1/12; B64C 1/06; B64C 1/061; B64C 1/064; B64C 1/065; B64C 3/26
    See application file for complete search history.

(56) References Cited

U.S. PATENT DOCUMENTS

| | | |
|---|---|---|
| 6,523,246 B1 | 2/2003 | Matsui et al. |
| 7,897,095 B2 | 3/2011 | Raeckers |
| 2007/0051863 A1 | 3/2007 | Froeschner et al. |

FOREIGN PATENT DOCUMENTS

| | | |
|---|---|---|
| DE | 60107614 T2 | 5/2005 |
| DE | 102005026010 A1 | 12/2006 |
| GB | 665850 A | 9/1989 |
| WO | 2007120037 A2 | 10/2007 |

OTHER PUBLICATIONS

German Patent Office, German Search Report for German Patent Application No. 10 2013 225 707.4 dated Jul. 23, 2014.

* cited by examiner

METHOD FOR MANUFACTURING A SHELL ELEMENT REINFORCED WITH SUPPORT ELEMENTS

CROSS-REFERENCE TO RELATED APPLICATION

This application claims priority to German Patent Application No. 10 2013 225 707.4, filed Dec. 12, 2013, which is incorporated herein by reference in its entirety.

TECHNICAL FIELD

The embodiments described herein relate to a method for manufacturing a shell element reinforced with support elements, in particular an aircraft structural element. Such an aircraft structural element can be, for example, an aircraft fuselage shell part, (e.g. a part of the upper wing shell or the lower wing shell, a part of a tail unit shell, etc.), applications related to the aerospace field, (e.g. structural parts of satellites, space shuttles, etc.), and structural parts of a helicopter.

BACKGROUND

It is known from the prior art, for example U.S. Pat. No. 7,897,095 B2, to produce shell elements, which are made of CFRP material and are reinforced with support elements, by first providing a cured skin element and then placing a plurality of support elements, in the form of stringer elements, onto the skin element in a longitudinal direction and parallel to one another, after which prepreg layers are placed on the lateral surfaces of the support elements, on both sides and in the form of angle brackets, and on the inner surface of the skin element. The prepreg layers are cured by means of an externally applied pressure and a certain temperature such that the support elements are fixed in position on the skin element.

A limitation of this approach, however, is that the support elements can be applied on the skin element only in a longitudinal direction, i.e., parallel to one another. In many applications, however, it is necessary for the skin element of the shell element to be stiffened in both surface directions of the skin element, i.e., also in a transverse direction, perpendicular to the support elements extending in the longitudinal direction. In order to provide support elements extending in the transverse direction in addition to the support elements extending in the longitudinal direction, a solution would have to be found in which the support elements extending in the longitudinal and transverse directions can cross over one another without this weakening the structure in the region of the intersection, i.e., without this largely interrupting the transmission of force.

To this end, it is known in the prior art, for example, to provide cuboid or box-shaped spacers, which are arranged on the skin element parallel to one another in a grid shape, and to then arrange support elements between the spacers, which are then connected with prepreg layers and are subsequently cured. After curing, the spacers can be removed and the result is a honeycombed structure comprising intersecting support elements on the inner surface of the skin element.

However, such a method is disadvantageous for the simple reason that it is very tedious and time-consuming to precisely place the spacers on the skin element in a defined manner and to arrange the support elements between these spacers and connect them.

It is therefore an objective to provide a method for manufacturing a shell element that is reinforced with support elements, wherein it is also possible to provide support elements that cross over one another and extend transversely to one another, on the inner surface of the skin element quickly, without a greater amount of effort, and without this weakening the structure or interrupting the transmission of force in one direction.

This object is achieved by a method for manufacturing a shell element reinforced with support elements, the method having the steps described in the following.

First, a skin element having an outer surface and an inner surface, which is opposite the outer surface, is provided (step (a)). In this context, a skin element is intended to mean a flat structure having a substantially greater extension in a plane parallel to the outer and inner surfaces than perpendicular to this plane, such as the outer skin of an aircraft structure, for example. The skin element is preferably formed of CFRP material.

Subsequently, a first support element is provided that extends along a first axis, in particular longitudinally, and has an attaching side parallel to the first axis and a free side opposite the attaching side (step (b)). Such a support element preferably has a substantially greater extension in a direction parallel to the first axis, along the said support element, and in a direction from the attaching side to the free side, than in a thickness direction perpendicular to these two aforementioned directions. Preferably this is a stringer element or a comparable structural element for stiffening the outer skin of an aircraft structure. The first support element is preferably formed of CFRP material.

As the next step, the first support element is attached on the skin element such that the attaching side of the first support element faces the inner surface of the skin element (step (c)). The attaching side of the first support element preferably rests on the inner surface of the skin element, in order to thereby absorb loads from the skin element.

Next, a first recess, preferably in the form of a slot, is formed on the first support element the slot extending away from the free side of the first support element and transversely to the first axis (step (d)). The forming of the first recess and the attachment of the first support element on the skin element can also take place in reverse order, i.e., steps (c) and (d) are interchangeable.

In the subsequent step, a second support element is provided, which extends along a second axis, preferably longitudinally, and has a support side and a front side opposite the support side (step (e)). The second support element is preferably designed in a manner analogous to the first support element, in particular in terms of the geometry thereof. Preferably this is a stringer element or a comparable stiffening element of an aircraft structure. The second support element is preferably made of CFRP material.

Next, the second support element is inserted into the first recess of the first support element such that the support side faces the inner surface of the skin element and such that the second axis of the second support element extends transversely to the first axis of the first support element (step (f)). The width of the first recess preferably corresponds to the width of the second support element, although a slight amount of play is permissible. After the support element is inserted into the first recess, the support side preferably rests on the inner surface of the skin element, thereby enabling the second support element to absorb loads from the skin element. The arrangement of the first support element and the second support element transversely to one another or such that the first axis and the second axis extend substantially transversely to one another is intended to mean that deviations from a 90° angle between the two axes should be included and that "transversely" is therefore intended to be broadly interpreted.

Finally, the second support element is attached on the first support element and/or on the skin element (step (g)). The second support element can therefore be attached on the first support element and, additionally or alternatively, on the skin element.

A method comprising the aforementioned steps therefore makes it possible to apply support elements that cross over one another and extend transversely to one another, on the inner surface of a skin element in a relatively simple and rapid manner, wherein an interruption of force does not occur in either of the two directions of extension of the support elements, and the shell element can therefore be designed to be equally, or nearly equally, stiff and durable in both directions.

In one preferred embodiment, a second recess, preferably in the form of a slot, is formed on the second support element, the slot extending away from the support side of the second support element and transversely to the second axis. In this case, the second support element is inserted into the first recess of the first support element at the location of the second recess while step (f) is being carried out, and therefore the first recess and the second recess intersect during the insertion, i.e., these engage into one another, and the sections of the second support element located next to the second recess encompass the first support element. A first end point of the first recess is then opposite a second end point of the second recess and, preferably, can also rest thereon. The width of the second recess preferably substantially corresponds to the width of the first support element, wherein a certain amount of play is permissible. A recess is thereby provided not only on the first support element, but also on the second support element, thereby making it possible to coordinate the extensions of the two recesses with one another in order to best compensate for the weakening of the structure associated with the recess.

In this regard, it is preferable for the first recess to extend away from the free side to a first end point that is spaced apart from the attaching side by a first distance, for the second recess to extend away from the support side to a second end point that is spaced apart from the front side by a second distance, and for the length of the first distance to correspond to the length of the second recess from the support side to the second end point. However, the length of the first distance can also be slightly shorter or longer than the length of the second recess from the support side to the second end point, and does not need to be identical thereto. As a result, the support side of the second support element can lie in a plane with the attaching side of the first support element, wherein both of these can preferably rest on the inner surface of the skin element.

The length of the second distance can preferably correspond to the length of the first recess from the free side to the first end point, thereby enabling the front side of the second support element to lock with the free side of the first support element. However, this can also be longer or shorter than the length of the first recess from the free side to the first end point such that one of the two support elements extends above the other. The front side and the free side of the support elements can then be brought to one level, preferably by means of material removal, for example by grinding or milling.

In a further embodiment, a projection is provided on the first support element and extends away from the skin element on the free side, wherein the first recess is formed in the projection. Since the recess is formed in the projection, this recess therefore extends less deeply into the first support element, and therefore the structure of the first support element is weakened to a lesser extent.

Preferably, the projection is formed by removing material from the first support element, on the free side thereof, on both sides of the first recess and at a distance therefrom. That is, the material of the first support element is removed on the free side thereof, in the direction toward the inner surface of the skin element, preferably along the entire extension of the support element along the first axis, except for a region adjoining the recess on both sides where material is not removed, the region therefore forming the projection. The material removal can be implemented by means of grinding or milling, for example. This step of material removal can be carried out after the first support element is attached on the skin element (step (c)) or before this step. In addition, the first recess can be introduced before or after the material is removed.

Furthermore, the first end point of the first recess lies in the plane in which the free side extends next to the projection. It is not necessary for the end point to be located exactly in this plane; instead, the end point can be located slightly above or below this plane. As a result, the first recess is formed entirely in the projection and therefore does not result in a weakening of the structure of the first support element.

According to a further embodiment, the first support element is attached on the skin element by means of prepreg layers, which are preferably made of CFRP material and which are placed onto the lateral surfaces of the first support element, between the attaching side and the free side, and on the inner surface of the skin element, next to the first support element, and which are subsequently cured. At least one prepreg layer is used in this case, although a plurality of prepreg layers lying one above the other is preferably used. The prepreg layers are placed onto at least one of the two lateral surfaces of the first support element and onto the adjacent region of the inner surface of the skin element, although the prepreg layers are preferably placed onto the two opposing lateral surfaces of the first support element and onto the corresponding adjacent regions of the inner surface of the skin element. The prepreg layers are placed onto the described surfaces in the non-cured, flexible state and are subsequently cured by means of a certain externally applied pressure and an appropriate externally applied temperature, whereby these prepreg layers stiffen and are fixed in the shape thereof in which they were applied.

Such a process of attaching a first support element on a skin element by means of prepreg layers is extensively described in U.S. Pat. No. 7,897,095 B2, the disclosure of which is hereby included in the present application.

According to a further embodiment, the second support element is attached on the first support element by means of prepreg layers, which are preferably made of CFRP material and which are placed onto the lateral surfaces of the first support element, between the attaching side and the free side, and onto the inner surfaces of the second support element, between the support side and the front side, and which are subsequently cured. In a manner analogous to the attachment of the first support element on the skin element by means of prepreg layers, it is also possible to provide one or a plurality of prepreg layers for attaching the second support element on the first support element. The prepreg layers are provided on one or both opposing sides or in all four corners between the first support element and the second support element.

In yet another embodiment, which can be carried out as an alternative to or in addition to the aforementioned embodiment, the second support element is attached on the skin element by means of prepreg layers that are preferably made of CFRP material that and are placed onto the lateral surfaces of the second support element, between the support side and the front side, and onto the inner surface of the skin element, next to the second support element, and which are subsequently cured. In this embodiment, which is analogous to the above-described embodiments, at least one and preferably a plurality of prepreg layers are provided on at least one lateral surface, preferably on both lateral surfaces, of the second support element and the corresponding adjacent regions of the inner surface of the skin element.

The attachment of the first support element and the second support element to one another and/or to the skin element by means of prepreg layers is particularly advantageous since the prepreg layers, in the uncured state, can be applied very flexibly into the corners between the support elements and the skin element and, in the cured state, impart great stiffness and strength, combined with low weight.

According to yet another embodiment, after the second support element has been attached on the first support element and/or on the skin element (step (g)), the projection is removed to a level in which the free side extends next to the projection. This can be carried out by means of milling or grinding, for example. In this manner, a uniform, level surface is created on the free side of the first support element, which, preferably, can also extend in a plane with the front side of the second support element. The projection was used in this case merely to hold the second support element on the first support element until these were attached by means of the prepreg layers, whereupon the projection can be removed in its entirety, i.e., after the prepreg layers have cured and the two support elements are fixed to one another and to the skin element.

In one embodiment, further support elements are provided on the skin element parallel to the first and/or second support element in a manner that is identical or similar to the first and/or second support element. In this manner, a grid comprising a plurality of support elements extending in parallel and transversely, i.e., crossing over one another, can be formed, the support elements supporting the skin element on the inner surface thereof and therefore forming a reinforced shell element. The prepreg layers can be applied continuously over a plurality of parallel support elements. The process of attaching the support elements on the skin element by means of prepreg layers can be simplified and accelerated in this manner.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

FIGS. 1 to 7 show various steps of an embodiment of the method for manufacturing a shell element 5, in particular an aircraft structural element, which is reinforced with support elements 1 and 3.

Figure 1:
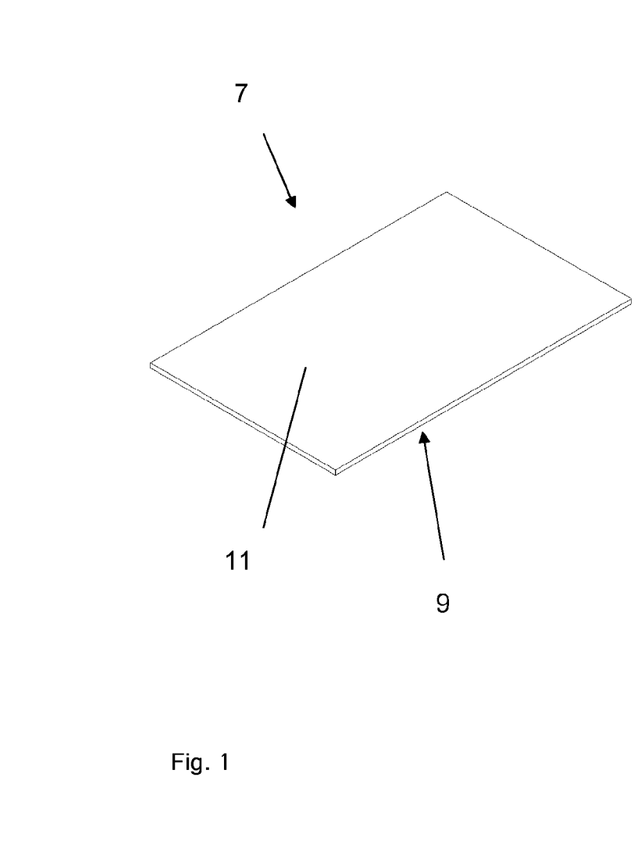
FIG. 1 shows a cured skin element made of CFRP material for manufacturing a shell element reinforced with support elements, in accordance with an embodiment.

According to the depicted embodiment of the method, the first step is to provide a skin element 7 made of CFRP material, namely an outer skin element of an aircraft structure, in this case that has an outer surface 9 and an inner surface 11 opposite the outer surface 9 (step (a), see FIG. 1).

Figure 2:
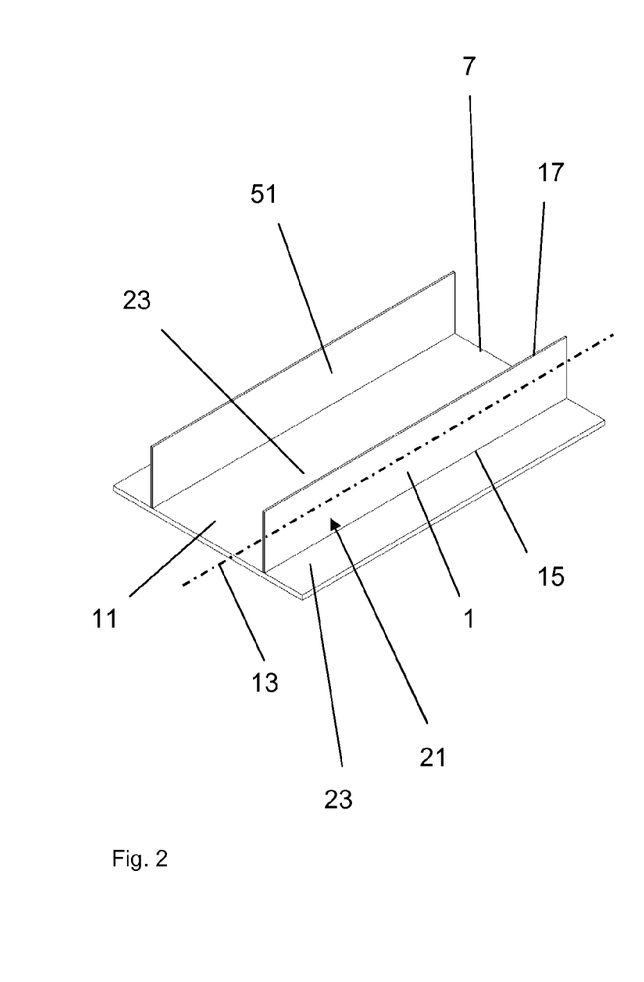
FIG. 2 shows a first support element that is disposed on the skin element of FIG. 1 and extends parallel to a further support element in accordance with an embodiment.

Subsequently, a first support element 1, for example a stringer element, is provided (step (b)), wherein the first support element extends longitudinally along a first axis 13 and has an attaching side 15, which extends parallel to the first axis 13, and a free side 17 opposite the attaching side 15, the first support element being disposed on the skin element 7 such that the attaching side 15 of the first support element 1 rests on the inner surface 11 of the skin element 7 (see FIG. 2).

Figure 3:
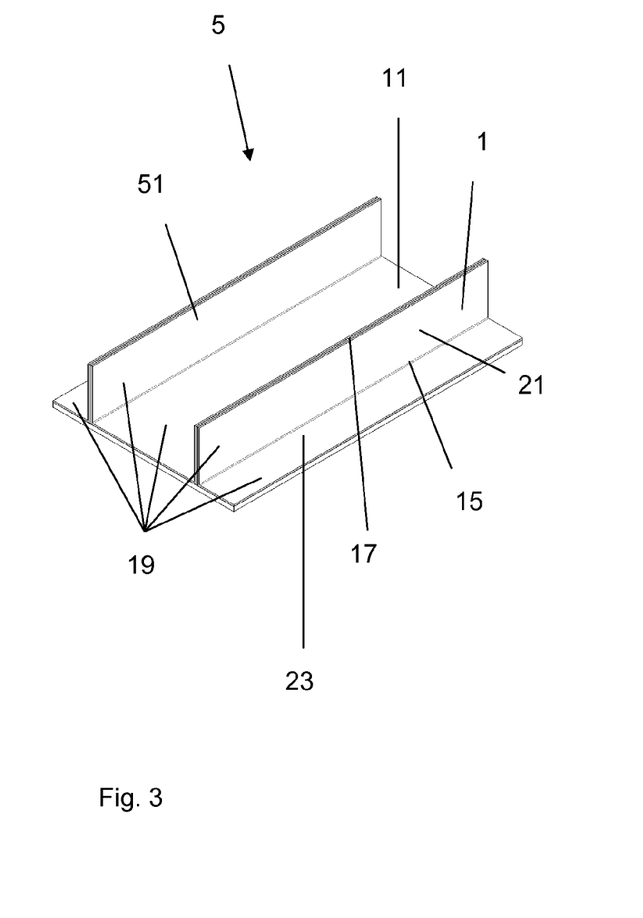
FIG. 3 shows the first support element of FIG. 2 attached on the skin element of FIG. 1 by means of prepreg layers in accordance with an embodiment.

The next step is to attach the first support element 1 on the skin element 7 by means of prepreg layers 19 that are placed onto the lateral surfaces 21 of the first support element 1, between the attaching side 15 and the free side 17, and onto the regions 23 of the inner surface 11 of the skin element 7, next to the first support element 1, and are subsequently cured, wherein the attaching side 15 of the first support element 1 faces the inner surface 11 of the skin element 1 and rests thereon (step (c), see FIG. 3).

Figure 4:
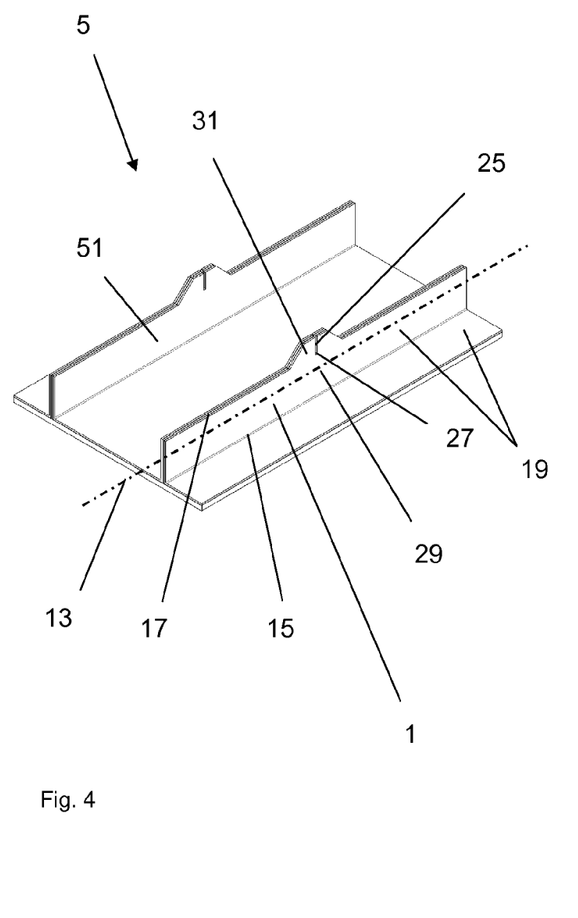
FIG. 4 shows the first support element of FIG. 3 provided with a projection and a first recess that is provided in the projection in accordance with an embodiment.

Subsequent thereto, a first recess 25, in the form of a slot, is introduced into the first support element 1, wherein the first recess 25 extends away from the free side 17 of the first support element 1 and transversely to the first axis 13 (step (d), see FIG. 4). The first recess 25 extends away from the free side 17 to a first end point 27 that is spaced apart from the attaching side 15 by a first distance 29. In the next step, or in a preceding step, a projection 31 is provided on the first support element 1, the projection extending away from the skin element 7 on the free side 17. The first recess 25 is formed in projection 31. The projection 31 is formed by removing material from the first support element 1, on the free side 17 thereof, namely on both sides of the first recess 25 and at a distance from the first recess 25 (see FIG. 4). This material removal can be implemented, for example, by means of milling or also by means of grinding. The first end point 27 of the first recess 25 is located in the plane in which the free side 17 extends next to the projection 31.

Figures 5, 6:
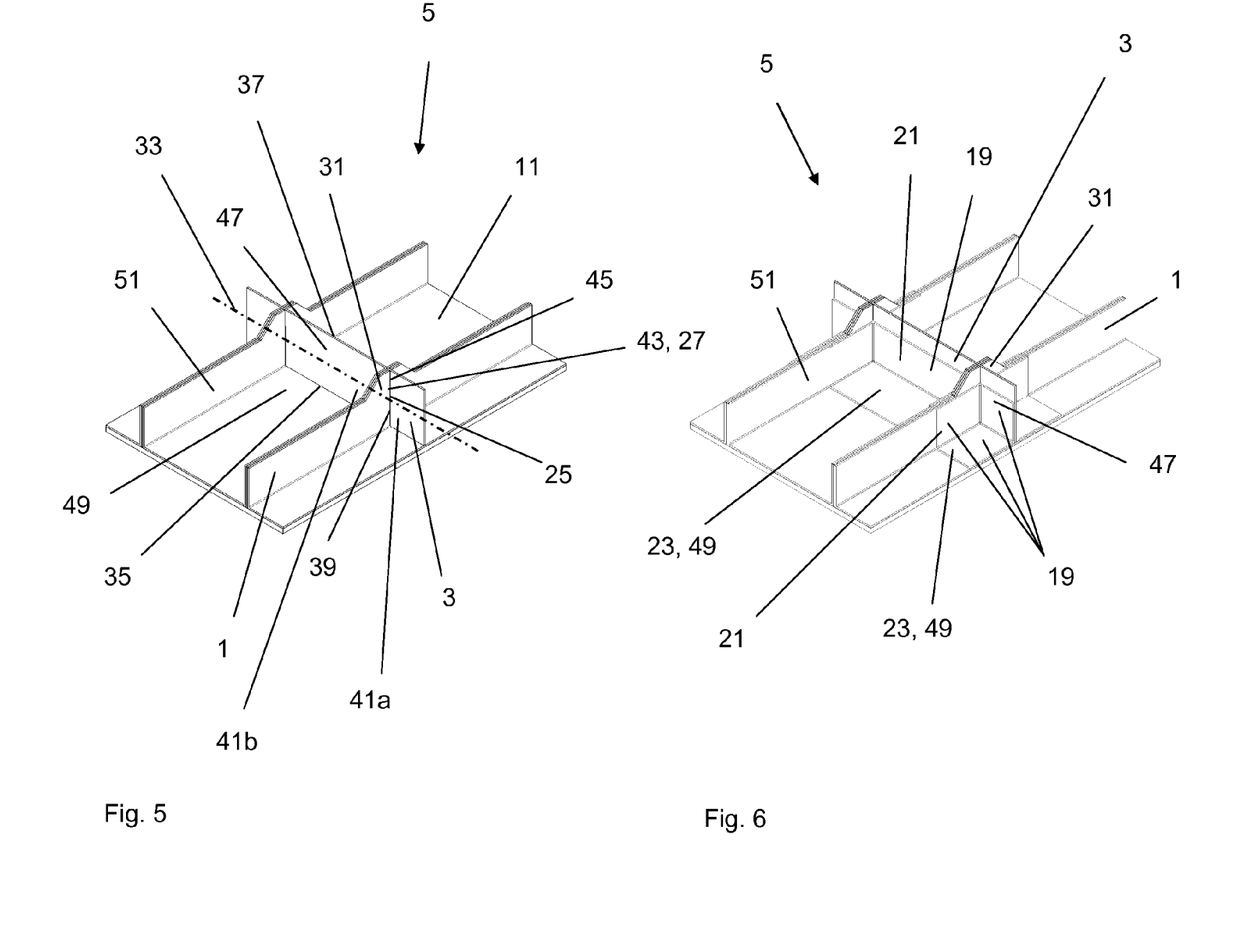
FIG. 5 shows the first support element of FIG. 4, wherein a second support element is disposed in the first recess so as to extend transversely to the first support element in accordance with an embodiment.
FIG. 6 shows the arrangement of the first support element and the second support element of FIG. 5, wherein the second support element is attached on the first support element and on the skin element by means of prepreg layers in accordance with an embodiment.

A second support element 3 is then provided, which can be a stringer element, for example, just as is the case with the first support element 1, and which extends longitudinally along a second axis 33 and has a support side 35 and a front side 37 opposite the support side 35 (step (e), FIG. 5). A second recess 39 is introduced into the second support element 3 in the form of a slot, which extends away from the support side 35 of the second support element 3 and transversely to the second axis 33.

Next, the second support element 3 is inserted into the first recess 25 of the first support element 1 such that the support side 35 faces the inner surface 11 of the skin element 7 and rests thereon, and such that the second axis 33 of the second support element 3 extends transversely to the first axis 13 of the first support element 1 (step (f), see FIG. 5). The second support element 3 is thereby inserted into the first recess 25 of the first support element 1 at the location of the second recess 39 such that the first and second recesses 25 and 39 cross or intersect one another during the insertion, and the sections 41a and 41b of the second support element 3 located next to the second recess 39 grip the first support element 1. The second recess 39 in the second support element 3 extends away from the support side 35 to a second end point 43, which is spaced apart from the front side 37 by a second distance 45. The length of the first distance 29 corresponds to the length of the second recess 39 from the support side 35 to the second end point 43, thereby allowing the second support element 3 to rest, via the support side 35, on the inner surface 11 of the skin element 7 and support skin element (see FIG. 5). At the same time, the length of the second distance 45 corresponds to the length of the first recess 25 from the free side 17 to the first end point 27, so that the front side 37 of the second support element 3 is aligned with the free side 17 of the first support element 1 in the region of the projection 31.

Finally, the second support element 3 is attached on the first support element 1 and on the skin element 7 (step (g), see FIG. 6). The second support element 3 is attached on the first support element 1 by means of prepreg layers 19 that are placed onto the lateral surfaces 21 of the first support element 1, between the attaching side 15 and the free side 17, and onto the lateral surfaces 47 of the second support element 3, between the support side 35 and the front side 37, and which are subsequently cured. The second support element 3 is likewise attached on the skin element 7 by means of prepreg layers 19 that are placed onto the lateral surfaces 47 of the second support element 3, between the support side 35 and the front side 37, and onto the inner surface 11 of the skin element 7 in the region 49 next to the second support element 3, and which are subsequently cured.

Figure 7:
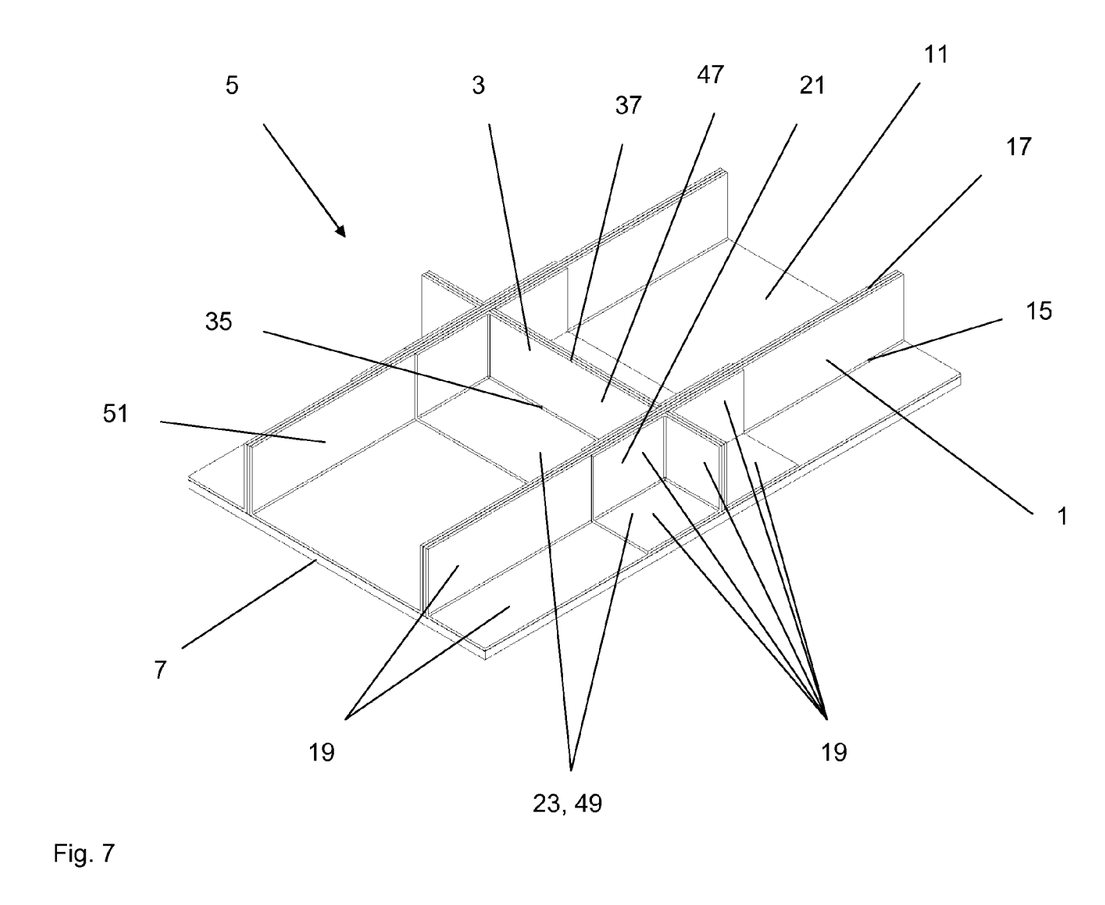
FIG. 7 shows the arrangement of the first support element and the second support element of FIG. 6, wherein the projection of the first support element, and the second support element on its front side are machined off to the level of the free side of the first support element in accordance with an embodiment.

As the final step, after the second support element 3 has been attached on the first support element 1 and on the skin element 7, the projection 31 is machined off, by means of milling or grinding, to the level in which the free side 17 extends next to the projection 31 (see FIG. 7). Likewise, the second support element 3 is machined off on the front side 37 to the level of the free side 17 such that the free side 17 and the front side 37 extend in one plane.

Further support elements 51 are provided parallel to the first and second support elements 1 and 3 and are applied on the skin element 7 in the same manner as the first and second support elements 1 and 3. A shell element 5 that is made of CFRP material and is reinforced with support elements 1, 3, and 51 can be manufactured particularly easily and rapidly in this manner, wherein support elements 1 and 3 are provided that extend perpendicularly to one another, i.e., cross over one another without a structural weakening at the intersection point.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for manufacturing a shell element reinforced with support elements, having the following steps of:
   (a) providing a skin element that has an outer surface and an inner surface disposed opposite the outer surface;
   (b) providing a first support element that extends along a first axis and has an attaching side that is parallel to the first axis, and a free side opposite the attaching side;
   (c) attaching the first support element on the skin element such that the attaching side of the first support element faces the inner surface of the skin element;
   (d) forming a first recess on the first support element, which proceeds from the free side of the first support element and extends transversely to the first axis;
   (e) providing a second support element that extends along a second axis and has a support side that is parallel to the second axis, and a front side opposite the support side;
   (f) inserting the second support element into the first recess of the first support element such that the support side faces the inner surface of the skin element, and such that the second axis of the second support element extends transversely to the first axis of the first support element; and
   (g) attaching the second support element on the first support element and/or on the skin element;
   wherein a projection is provided on the first support element, the projection extending on the free side away from the skin element;
   wherein the first recess is formed in the projection; and
   wherein the projection is formed by removing material from the first support element, on the free side thereof, on both sides of the first recess and at a distance from the first recess.

2. The method of claim 1, wherein a second recess is formed on the second support element, the recess extending from the support side of the second support element and transversely to the second axis, and
   wherein the second support element is inserted into the first recess of the first support element at the location of the second recess such that the first and second recesses intersect one another during the insertion, and the sections of the second support element located next to the second recess encompass the first support element.

3. The method of claim 2, wherein the first recess extends from the free side to a first end point that is spaced apart from the attaching side by a first distance,
wherein the second recess extends from the support side to a second end point that is spaced apart from the front side by a second distance, and
wherein the length of the first distance corresponds to the length of the second recess from the support side to the second end point.

4. The method of claim 1, wherein a first end point of the first recess lies in the plane in which the free side extends next to the projection.

5. The method of claim 1, further comprising attaching the first support element on the skin element by means of prepreg layers that are placed onto lateral surfaces of the first support element, between the attaching side and the free side, and onto regions of the inner surface of the skin element, next to the first support element, and which are subsequently cured.

6. The method of claim 1, further comprising attaching the second support element on the first support element by means of prepreg layers that are placed onto lateral surfaces of the first support element, between the attaching side and the free side, and onto lateral surfaces of the second support element, between the support side and the front side, and which are subsequently cured.

7. The method of claim 1, wherein the second support element is attached on the skin element by means of prepreg layers that are placed onto lateral surfaces of the second support element, between the support side and the front side, and onto regions of the inner surface of the skin element, next to the second support element, and which are subsequently cured.

8. The method of claim 1, wherein, after the second support element has been attached on the first support element and/or on the skin element, the projection is removed to a level at which the free side extends next to the projection.

9. The method of claim 1, further comprising providing, on the skin element, additional support elements that are parallel to the first and/or the second support element.

10. A method for manufacturing a shell element reinforced with support elements, having the following steps of:
providing a skin element that has an outer surface and an inner surface disposed opposite the outer surface;
providing a first support element that extends along a first axis and has an attaching side that is parallel to the first axis, and a free side opposite the attaching side;
attaching the first support element on the skin element such that the attaching side of the first support element faces the inner surface of the skin element;
forming a first recess on the first support element, which proceeds from the free side of the first support element and extends transversely to the first axis;
providing a second support element that extends along a second axis and has a support side that is parallel to the second axis, and a front side opposite the support side;
inserting the second support element into the first recess of the first support element such that the support side faces the inner surface of the skin element, and such that the second axis of the second support element extends transversely to the first axis of the first support element; and
attaching the second support element on the first support element and/or on the skin element;
wherein a projection is provided on the first support element, the projection extending on the free side away from the skin element;
wherein the first recess is formed in the projection; and
wherein, after the second support element has been attached on the first support element and/or on the skin element, the projection is removed to a level at which the free side extends next to the projection.

* * * * *